July 5, 1966  C. E. JORDAN  3,258,985
CONTROL APPARATUS FOR VALVE ACTUATOR
Filed March 23, 1964  2 Sheets-Sheet 1
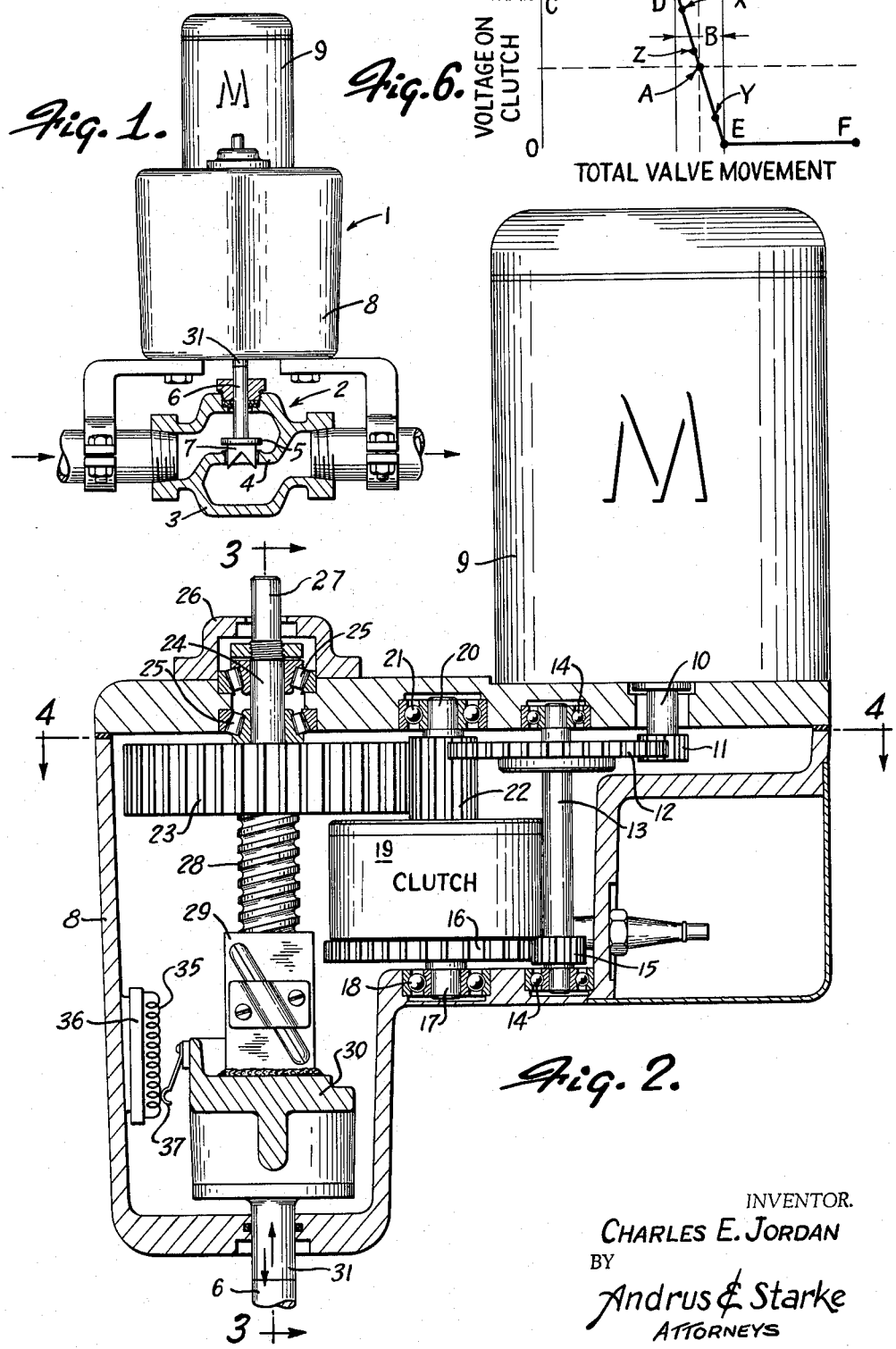
INVENTOR.
CHARLES E. JORDAN
BY
Andrus & Starke
ATTORNEYS

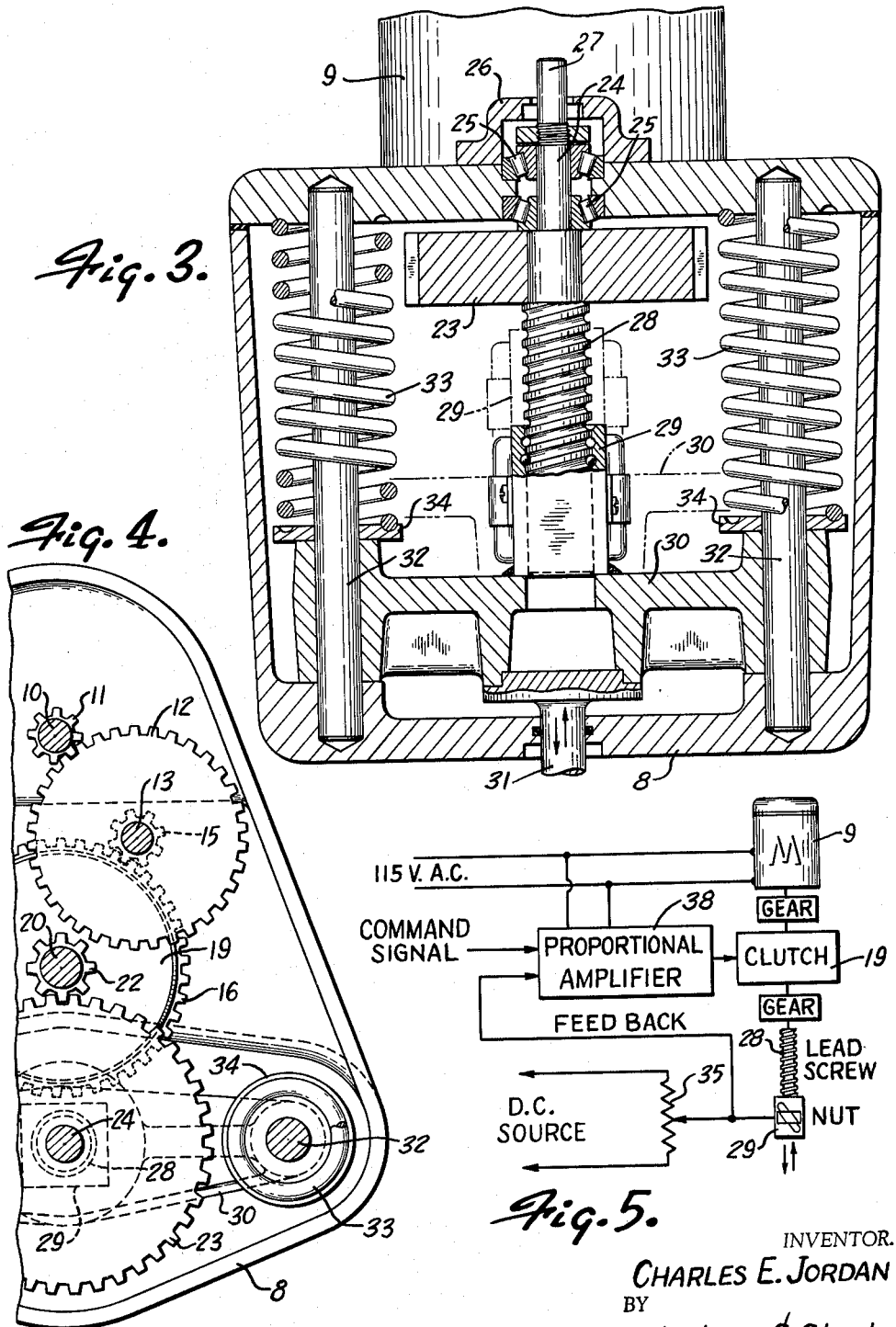

United States Patent Office 3,258,985
Patented July 5, 1966

3,258,985
CONTROL APPARATUS FOR VALVE ACTUATOR
Charles E. Jordan, Milwaukee, Wis., assignor to Jordan Controls, Inc., Milwaukee, Wis., a corporation of Wisconsin
Filed Mar. 23, 1964, Ser. No. 353,664
9 Claims. (Cl. 74—472)

This invention relates to a control apparatus and more particularly to an actuator for controlling a linear moving element.

In process control systems, the basic valve used to control the flow of fluids is a sliding stem type in which the valve stem moves axially to open and close the valve. In the past, there have been a variety of actuators used to automatically control the sliding stem valve. One of the more simple types of actuators employs an air diaphragm which is attached to the valve stem. An air signal on one side of the diaphragm opposes a spring on the other so that a given pressure is offset by the spring rate to cause the valve stem to move accordingly.

Due to the present trend toward more electronic control, there has been an increasing demand for electrical actuators. In one type of electrical actuator, a motor drives a lead screw through a conventional gear system to move a sliding nut axially. The nut is attached to the stem of the valve and gives a position corresponding to the motor-driven lead screw position. A device of this type, however, requires an expensive reversible motor and has the additional problem that in the case of power failure, there is no automatic shutoff of the valve.

Other electrical actuators employ a single-direction motor which drives into a pair of magnetic clutches which in turn drive the lead screw. By energizing one or the other of the two clutches, the lead screw is turned in either direction to increase or decrease the valve opening. This system requires the use of two clutches and again, does not have an automatic shutoff in the case of power failure.

The present invention is directed to an improved electrical actuator for controlling a linear moving element which positions the element with a high degree of accuracy and at a relatively high response rate. According to the invention, a continuously operating, single-direction motor drives through a gear system to the input side of an electrical, continuous-slip clutch having a torque output proportional to the voltage applied. The output of the clutch drives through a second gear system to rotate a lead screw, and a reciprocating ball nut is engaged with the screw and moves axially in accordance with rotation of the screw. The nut is connected to a sliding yoke which in turn is connected to the valve stem or other element to be controlled.

The nut and yoke are spring biased in a direction opposite to the direction of movement of the nut by the torque output of the clutch. With this construction, as a voltage is applied to the clutch sufficient to overcome the force of the spring, the nut is moved in one direction. If the voltage on the clutch is reduced, the force of the spring overcomes the driven torque and the nut moves in the opposite direction. Thus, for any given voltage on the clutch, there is a torque output sufficient to balance the spring rate and hold the nut and valve in a given open position, at which position the clutch will slip continuously.

Due to frictional forces and hydraulic forces which act on the valve or valve stem, there is apt to be some distortion of the positioning so that a positioned feedback is generally used. With the positioned feedback movement of the valve stem is fed back to a single-direction, proportional amplifier which drives the clutch, and the feedback will thereby alter the voltage of the clutch in accordance with the movement of the valve.

The actuator of the invention positions the sliding element with a high degree of accuracy and at a relatively high response rate. An inexpensive, continuously operating, single-direction motor can be used, and a single, continuous-slip clutch is employed with the torque output of the clutch acting in opposition to the spring force to hold the valve in any desired opened or closed position.

The use of the fast pitch, recirculating ball nut enables the spring to easily and efficiently drive back through the nut to close the valve and give a fail-safe operation in the event of power failure.

Other objects and advantages will appear in the course of the following description.

The drawings illustrate the best mode presently contemplated of carrying out the invention.

In the drawings:

FIG. 1 is a side elevation showing the actuator connected to a slip stem valve;

FIG. 2 is a longitudinal section taken through the actuator;

FIG. 3 is a section taken along line 3—3 of FIG. 2;

FIG. 4 is a transverse section taken along line 4—4 of FIG. 2;

FIG. 5 is a schematic drawing showing the positioned feedback; and

FIG. 6 is a graph showing the characteristics of movement of the valve with voltage applied to the clutch.

The drawings illustrate a control apparatus or actuator 1 which is operably connected to a valve 2. The valve may be employed in an automatic process control system and serves to control the flow of fluid passing through a conduit.

As best shown in FIG. 1, the valve, which is a conventional slip stem valve, includes a valve body 3 which defines a valve seat 4. A valve element 5 is carried by a stem 6 and is adapted to engage the seat 4 to close off fluid flow through the valve body 3.

The valve element 5 includes a cup-like member 7 having a pair of V-shaped recesses which, when the valve element is in the partially opened position, provides controlled flow of fluid through the valve body.

As previously mentioned, the valve 2 is a slip stem type in which the valve element 5 is opened and closed by axial movement of the valve stem 6, and the actuator 1 is connected to and supported by the valve body or piping and serves to control the axial movement of the stem 6.

Actuator 1 includes an outer casing 8 having a continuously operating, single-direction motor 9 mounted on the upper surface of the casing. The drive shaft 10 of the motor extends downwardly through the upper wall of the casing and carries a pinion 11 which engages a gear 12 secured to shaft 13. The ends of the shaft 13 are journalled within bearings 14 secured within the walls of the casing 8.

The shaft 13 also carries a pinion 15 which meshes with a gear 16 on shaft 17. As shown in FIG. 3, the lower end of the shaft 17 is journalled within a bearing 18 secured within an opening in the casing wall. The gear 16 is an integral part of the input side of an electrical, continuous-slip clutch 19 in which the torque output of the clutch is proportional to the voltage applied. The clutch 19 is of conventional construction and can be a multiple wet disk clutch in which layers of steel and bronze are inter-leaved. The greater the voltage which is applied to the layers results in a greater pressure on the layers and less slippage of the clutch.

In addition, the continuous-slip clutch may also take the form of a magnetic particle clutch in which the voltage energizes the field to change the magnetic particle relationship and vary the torque output.

The output shaft 20 of the clutch 19 is journalled within a bearing 21 and carries a gear 22 which meshes with gear 23 on shaft 24. The upper end of shaft 24 is journalled within a pair of bearings 25 which are housed within a bearing cap 26. The upper end 27 of shaft 24 extends through the cap in a position where it can be manually engaged.

The shaft 24 also carries a fast pitch lead screw 28, and a recirculating ball nut 29 is engaged with the lead screw. Rotation of the lead screw 28 serves to move the nut 29 axially on the screw.

A yoke 30 is secured to the nut 29, and the yoke is connected to a stem 31 which is connected to the valve stem 6 of valve 2.

As best shown in FIG. 3, the yoke 30 is guided in sliding movement by a pair of guide rods 32 which extend through openings in the yoke and the ends of the rods are received within recesses in the upper and lower surfaces of casing 8.

The yoke 30 and nut 29 are biased downwardly to urge the valve element 5 to the closed position by a pair of coil springs 33 which are positioned around the guide rods 32. The upper ends of the springs 33 bear against the upper wall of casing 8, while the lower ends of the springs bear against spring seats 34 which are supported on the yoke 30.

The springs 33 are designed so that in their extended position, as shown in FIG. 3, they exert a substantial force, generally in the neighborhood of 500 to 600 pounds, on the valve element 5 to maintain the valve element in the closed position. It is therefore necessary for the torque output of the clutch to exceed this force of the springs 33 before the valve can be opened.

In operation, the motor 9 operates continuously in the same direction at a constant speed, and the gear system provided by gears 11, 12 and 15, 16, serves to reduce the speed and increase the torque to the input of the clutch 19. The output torque of the clutch 19, which is determined by the voltage applied to the clutch, acts through the gear system provided by gears 22 and 23 to rotate the lead screw 28. When the voltage applied to the clutch is sufficient to provide a torque output large enough to overcome the force of the springs 33, the nut will be moved upwardly, as shown in FIG. 3, to open the valve. As the force of the springs 33, which are being compressed as the nut moves upwardly, approaches the torque output of the clutch 19, the upward movement of the nut will be reduced until the force of the springs equals the torque necessary to further compress the springs. In this situation, movement of the nut will stop and the clutch 19 will be in a full slip position.

If the voltage applied to the clutch 19 is then reduced, the torque output of the clutch will be reduced and the force of the springs will move the yoke and nut downwardly until the force of the spring equals the torque output of the clutch, at which point the nut will stop movement and a null point will again be reached in which the clutch is in a full slip position, and the torque output of the clutch balances the force of the springs. If the voltage applied to the clutch produces a torque output less than the force of the springs 33, the nut will be moved downwardly and the valve element 5 will close completely.

The command signal, either manual or process control, is transmitted to the proportional amplifier which controls clutch 19 to provide the desired output torque to open the valve element 5 to a given degree. A variation in frictional force on the valve stem, or a variation in hydraulic forces on the valve element 5, may cause a distortion or variation in the amount the valve is opened for a given output voltage. To overcome this distortion and provide a more accurate control, a feedback mechanism can be employed. The feedback mechanism may take the form of a linear slide wire 35 which is mounted on a bracket 36 attached to the casing 8. A contact 37 is attached to the yoke and rides along the slide wire 35 in accordance with movement of the nut 29 and yoke 30. As shown in FIG. 5, a feedback signal from the slide element 35 is fed into the proportional or differential amplifier 38 along with a voltage signal from a process command source. The two voltage inputs are compared by the differential amplifier 38 and any difference between the inputs will produce an output voltage which is fed to clutch 19 to thereby change the output torque and position the valve element 5 to compensate for frictional or hydraulic unbalances.

In conjunction with the feedback, a proportional band may be employed. The voltage is applied to the clutch by the single-direction proportional servo amplifier 38 which provides either maximum or minimum voltage output outside of the proportional band. That is to say, an input voltage is transmitted to the amplifier 38 from a command source to move the valve to a given or command position and is compared with a feedback input voltage. If the difference between these two input voltages is greater than the predetermined proportional band voltage, the amplifier is designed to provide either a maximum or minimum voltage output until the difference between command and feedback voltage reaches the proportional band and within this band, which straddles the command position, the voltage output will change sharply from maximum to minimum. This can be best seen in FIG. 6 which plots the output voltage characteristics of the amplifier against the total valve movement from full closed to full open position. In this curve, the point A represents the pre-set command position of the valve and B represents the proportional band straddling the command position. As the valve starts to open, moving toward the command position moving along line CD, the voltage output is at a maximum until the valve position, as signalled by the feedback potentiometer 35, reaches the point D at the band and then the voltage falls off sharply along the inclined portion of the curve indicated by DE. The voltage will decrease along the sloped line DE until the voltage is achieved which will produce a torque output of clutch 19 sufficient to hold the valve open at the command position. At this null position along slope DE, the clutch 19 will be full slip position. The null position on slope DE will depend on the degree of openness of the valve which is desired and set by the command signal. For example, if it is desired to open the valve to three fourths of its full open position, the null point will be along the upper portion of the slope DE, such as that indicated by X. However, if it is desired to only open the valve to one fourth of its full open position, the null point will be along the lower portion of the slope DE, such as indicated by Y.

Similarly, if the valve is to be partially closed to the command position from a full open position, the voltage output would be at the minimum or zero, as the valve moves along line FE in FIG. 6 toward the command position until the valve position reaches the point E at the band B and then the voltage will increase abruptly along slope ED until the null point is reached. As an example, if the total valve movement is 2 inches from a full closed to a full open position, and a 1% proportional band is set in the amplifier, the band would be 0.02 inch in width. When a command signal is transmitted to the amplifier, either manually or by automatic process control to open the valve to a command position, the amplifier will provide maximum voltage output until the valve reaches a position 0.01 inch from the desired command position. The voltage will then drop until the null point is reached along slope DE. If the valve is then to be closed, the output voltage will drop to the minimum voltage by the time the valve has moved 0.01 inch from the command position, and the voltage will then remain at the minimum voltage until the valve is closed.

The width of the proportional band BC, as shown in FIG. 6, can be changed as desired by the proportional amplifier and preferably will be about 1% of the total valve movement and generally under 10% of the total valve movement. By having a narrow proportional band in which the curve has a steep slope from maximum to minimum voltage, the amount of movement or position of the valve will not change to any great degree by overriding forces, and variations in the voltage will result in a very small change in valve position along the slope DE and within the proportional band 3.

If the valve element 5 is in an open position and an unbalance is produced, for example, by a variation in hydraulic pressure acting to move element 5 upwardly, the contact 37 will move on the linear slide element 35, in accordance with upward movement of valve element 5 and yoke 30, to produce a feedback signal to the proportional amplifier 38 which will produce a voltage decrease to the clutch 19. This voltage decrease will reduce the output torque and cause springs 33 to move the valve element 5 downwardly until a new null or stop position is reached where the spring force equals the torque of the clutch plus the hydraulic force on the valve. If, for example, the original null point was at position X on the slope DE, shown in FIG. 6, the new null point in which the spring force is balanced against the torque at the clutch plus the hydraulic force on the valve, could be at point Z along the slope DE. As previously mentioned, the steep slope DE of the voltage curve shown in FIG. 6 is desirable in that a substantial change in the voltage will only result in a small change in the position of the valve element 5.

The actuator of the invention positions the sliding element with a high degree of accuracy and at a relatively high response rate. By using the feedback mechanism, the sliding element is positioned accurately even though unbalance may occur due to frictional or hydraulic forces.

The torque output of the clutch is balanced against the spring force of the springs 33 and on release of the torque output, either when desiring to close the valve or in the case of power failure, the springs 33 will act to positively and quickly close the valve. The recirculating-ball nut provides a high efficiency of spring return and permits the nut to move rapidly along the lead screw under the force of springs 33.

The control apparatus of the invention employs an inexpensive, continuously operating, single-direction motor. This substantially reduces the cost over a unit in which a reversible motor is required.

It is contemplated that the entire mechanism within the casing 8 can be immersed in an oil bath which aids in the life of the gearing, clutch and lead screw, and also provides explosion-proof characteristics. Due to the shape of the casing 8, the unit can be mounted horizontally as well as vertically and in no case will the motor drive shaft be submerged in the oil contained within the casing.

While the description has described the use of a motor 9, a gear drive and a continuously-slip clutch 19, it is contemplated that a torque motor or other variable torque means can be employed in place of these elements.

The end 27 of the shaft 24, which projects through the casing 8, enables the end 27 to be engaged by a wrench and turned manually to thereby provide manual overriding or positioning for the device, if desired.

Various modes of carrying out the invention are contemplated as being within the scope of the following claims particularly point out and distinctly claiming the subject matter which is regarded as the invention.

I claim:

1. An apparatus for controlling the movement of a linear moving element, comprising a linear moving output member connected to the element to be controlled, resilient means operably connected to the output member for urging the output member in one direction, variable torque means for producing an output torque, and means interconnecting the variable torque means and the output member for converting rotational movement of the variable torque means to linear movement in said output member and in the opposite direction to the direction which said resilient means is urging said output member, whereby output torque of the variable torque means opposes the force of said resilient means and a given output torque will be balanced by a compression of said resilient member to hold the element at a given position.

2. A control apparatus for controlling the movement of a linear moving element, comprising a linear moving output member adapted to be connected to an element to be controlled, compressible resilient means operably connected to the output member for urging the member in one direction, variable single-direction torque means for producing an output torque proportional to an input voltage, and rotatable means operably connecting said variable torque means and said output member for driving the output member in linear movement in opposition to the force of said resilient means, whereby the output torque of said variable torque means opposes the force of the resilient means and a given output torque will be balanced by a compression of said resilient means to hold the element at a given position.

3. A control apparatus for controlling the movement of a linear moving element, comprising a linear moving output member adapted to be connected to an element to be controlled, compressible resilient means operably connected to the output member for urging the member in one direction, variable torque means for producing an output torque proportional to an input voltage, means for supplying an input voltage to said variable torque means, a lead screw operably connected to said variable torque means and disposed to rotate in accordance with the torque output of said variable torque means, and a nut operably connected to the output member and threadedly engaged with said lead screw, said nut being movable in one direction by rotation of said lead screw and being movable in the opposite direction by force of said resilient means, whereby the output torque of the variable torque means opposes the force of said resilient means and a given output torque will be balanced by a compression of the resilient member to hold the nut and said output member at a given position.

4. A control apparatus for controlling the movement of a linear moving element, comprising a linear moving output member adapted to be connected to an element to be controlled, compressible resilient means operably connected to the output member for urging the member in one direction, variable torque means for producing an output torque proportional to an input voltage, amplifier means for supplying an input voltage to said variable torque means in response to a command signal, means interconnecting the variable torque means and the output member for converting rotational movement of the variable torque means to linear movement of the output member in the opposite direction from the direction the resilient means is urging said output member, whereby output torque of the variable torque means opposes the force of the resilient means and a given output torque will be balanced by a compression of the resilient member to hold the element at a given position, and feedback means responsive to the movement of the output member for establishing a feedback signal to said amplifier means to thereby change the input voltage to the variable torque means and compensate for unbalances in the system.

5. The structure of claim 3 in which the lead screw has a fast pitch and the nut is a recirculating ball type.

6. An apparatus for controlling the movement of a linear moving element, comprising a casing, a linear moving output member slidably mounted in the casing and adapted to be connected to an element to be controlled, a motor mounted on the casing, an electrical continuous-slip clutch mounted in the casing and having an output torque proportional to the applied voltage, first gear means interconnecting the motor and the input side of said clutch, means interconnecting the output side of the clutch and the output member for converting rotational movement of the output side of the clutch to linear movement in said output member in one direction, and resilient means operably connected to the output member for urging the output member in the opposite direction to the direction the output member is moved by said output torque whereby output torque of the clutch opposes the force of the resilient means and a given output torque will be balanced by a compression of the resilient means to hold the element at a given position.

7. A control apparatus for controlling the movement of a linear moving element, comprising a linear moving output member adapted to be connected to an element to be controlled, compressible resilient means operably connected to the output member for urging the member in one direction, variable torque means for producing an output torque proportional to an input voltage, amplifier means for supplying an input voltage to said variable torque means in response to a command signal, means interconnecting the variable torque means and the output member for converting rotational movement of the variable torque means to linear movement of the output member in the opposite direction from the direction the resilient means is urging said output member, whereby output torque of the variable torque means opposes the force of the resilient means and a given output torque will be balanced by a compression of the resilient member to hold the element at a given position, and electrical feedback means responsive to the movement of the output member for establishing an electrical feedback signal to said amplifier means to thereby change the input voltage to the variable torque means to compensate for unbalances of the system.

8. A control apparatus for controlling the movement of a linear moving element, comprising a linear moving output member adapted to be connected to an element to be controlled, compressible resilient means operably connected to the output member for urging the member in one direction, variable torque means for producing an output torque proportional to an input voltage, amplifier means for supplying an input voltage to said variable torque means in response to a command signal, said amplifier means being characterized by the ability to produce a constant maximum output voltage on one side of a band of valve movement and to produce a constant minimum output voltage on the opposite side of said band and the voltage output of said amplifier means changing abruptly within said band from said maximum voltage to said minimum voltage, and means interconnecting the variable torque means and the output member for converting rotational movement of the variable torque means to linear movement of the output member in the opposite direction from the direction the resilient means is urging said output member, whereby output torque of the variable torque means opposes the force of the resilient means and a given output torque will be balanced by a compression of the resilient member to hold the element at a given position.

9. A control apparatus for controlling the movement of a linear moving element, comprising a casing, a linear moving output member extending from the casing and adapted to be connected to an element to be controlled, resilient means located within the casing and operably connected to the output member for urging the member in one direction, variable torque means for producing an output torque proportional to an input voltage, means for supplying an input voltage to said variable torque means, a lead screw operably connected to said variable torque means and disposed to rotate in accordance with the torque output of said variable torque means, a nut operably connected to the output member and threadedly engaged with said lead screw, said nut being movable in one direction by rotation of said lead screw and being movable in the opposite direction by said resilient means, whereby the output torque of said variable torque means opposes the force of said resilient means and a given output torque will be balanced by a compression of the resilient member to hold the nut and said output member in a given position, and means connected to said lead screw and extending outwardly of said casing in position to be manually actuated to thereby manually rotate said lead screw.

References Cited by the Examiner
UNITED STATES PATENTS

| | | | |
|---|---|---|---|
| 2,480,212 | 8/1949 | Baines | 192.02 |
| 2,778,239 | 1/1957 | Hoover | 74—424.8 |
| 2,930,571 | 3/1960 | Vogl | 74—424.8 X |

DAVID J. WILLIAMOWSKY, *Primary Examiner.*

L. H. GERIN, *Assistant Examiner.*